No. 817,526.   
PATENTED APR. 10, 1906.  
J. E. SHAFFER.  
HORSESHOE.  
APPLICATION FILED JAN. 6, 1905. RENEWED MAR. 10, 1906.
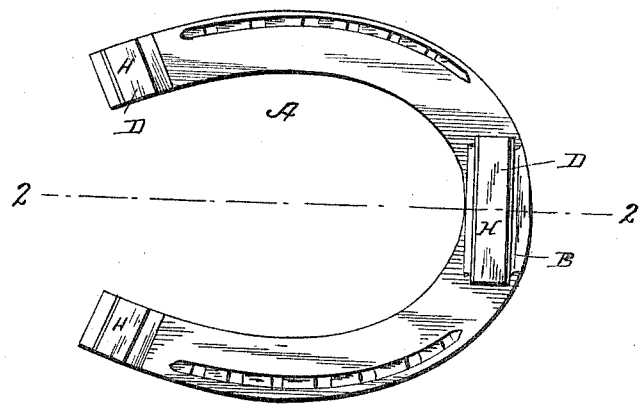
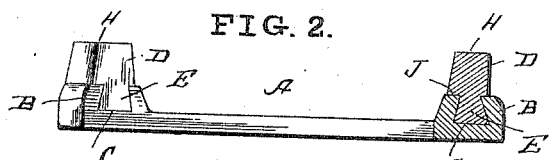
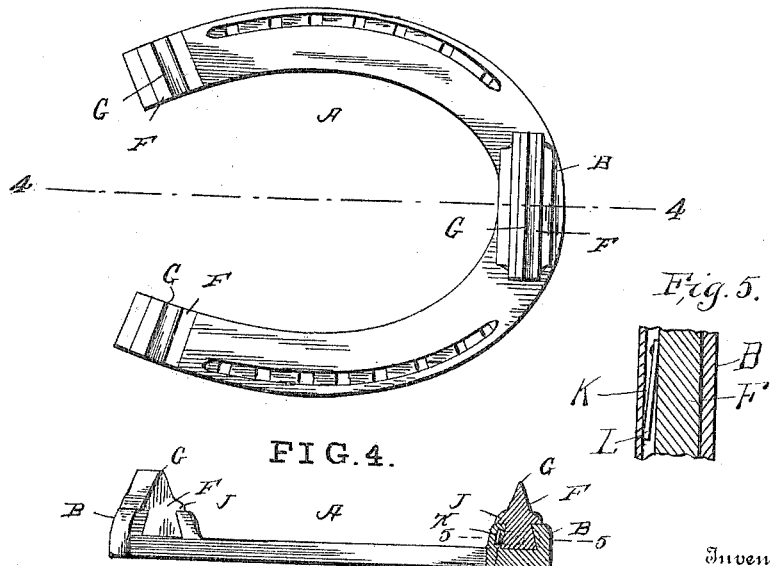
Witnesses  
Inventor  
John E. Shaffer  
By  
Attorney

UNITED STATES PATENT OFFICE.

JOHN E. SHAFFER, OF CUMBERLAND, MARYLAND, ASSIGNOR TO JAMES J. BURNS, OF CUMBERLAND, MARYLAND.

HORSESHOE.

No. 817,526.      Specification of Letters Patent.      Patented April 10, 1906.

Application filed January 6, 1905. Renewed March 10, 1906. Serial No. 305,312.

*To all whom it may concern:*

Be it known that I, JOHN E. SHAFFER, a citizen of the United States, residing at Cumberland, in the county of Allegany and State of Maryland, have invented certain new and useful Improvements in Horseshoes, of which the following is a specification.

My invention relates to improvements in horseshoes; and one object of my invention is the provision of a horseshoe which will permit the ready application of calks of various shapes according to the character of service for which the shoe is intended and which horseshoe will possess merit in point of inexpensiveness and durability and which will be thoroughly efficient and practical in every particular.

To attain the desired object the invention consists of a horseshoe embodying novel features of construction, combinations, and arrangements of parts for service, substantially as disclosed herein.

Figure 1 represents a plan view looking at the under face of the horseshoe. Fig. 2 represents a sectional view taken on the line 2 2 of Fig. 1. Fig. 3 represents a plan view with a modified construction of calk, and Fig. 4 represents a sectional view taken on the line 4 4 of Fig. 3 and shows the spring-clips on the calk for retaining the calks in position in their seats. Fig. 5 is a sectional view on line 5 5 of Fig. 4 looking downward.

In the drawings the letter A designates the horseshoe proper, the heel and toe portions of which are formed with lugs or projections B, which are provided with dovetailed or tapered sockets or seats C, and in the form of my invention shown in Figs. 1 and 2 flat-faced calks D are used, formed with tapered tenons E, which fit snugly in the sockets or seats of the horseshoe.

In the form of my invention shown in Figs. 3 and 4 the calks F are provided with sharpened or flat pointed ends G to enable the calks to enter the ice more readily, the form shown in Figs. 1 and 2 having the flat faces H, which may be used when desired. In all forms of the invention the under side of the calks are provided with shoulders J, which causes a smooth snug fit of the calks in the sockets or seats, and the toe-calk is fitted in an elongated or longer seat than the heel-calk.

It is evident that I provide a horseshoe particularly adapted for winter use and which possesses every requisite to render it thoroughly efficient, entirely practical, and desirable for the purpose intended.

In the detail view illustrated in Figs. 4 and 5 I provide the horseshoe with small kerfs or recesses K, in which is adapted to spring the spring-tongue L, formed on the calk, which secures the calk in position and prevents accidental detachment thereof.

I claim—

A horseshoe having projections at its heel and toe portions, mortised seats in said projections, said toe projection being elongated and having a kerf in the inner vertical wall of the seat therein, calks formed with tapered tenons adapted to fit in said seats, a spring-tongue formed on the toe-calk adapted to engage said kerf, and shoulders on said calks adapted to abut against the face of the projections on the shoe.

In testimony whereof I affix my signature in presence of two witnesses.

JOHN E. SHAFFER.

Witnesses:
    MARTIN W. HIMMLER,
    GEORGE A. SIEBERT.